United States Patent [19]
Umeda et al.

[11] Patent Number: 5,955,810
[45] Date of Patent: Sep. 21, 1999

[54] ALTERNATOR FOR VEHICLE

[75] Inventors: Atsushi Umeda, Okazaki; Tsutomu Shiga, Nukata-gun; Shin Kusase, Oobu, all of Japan

[73] Assignee: Denso Corporation, Kariya, Japan

[21] Appl. No.: 09/084,293

[22] Filed: May 26, 1998

[30] Foreign Application Priority Data

| May 26, 1997 | [WO] | WIPO | PCT/JP97/01778 |
| Sep. 22, 1997 | [WO] | WIPO | PCT/JP97/03374 |
| Sep. 26, 1997 | [JP] | Japan | 9-279750 |
| Feb. 10, 1998 | [JP] | Japan | 10-044390 |

[51] Int. Cl.$^6$ .............. H02K 3/04; H02K 5/24; H02K 9/00; H02K 1/32
[52] U.S. Cl. .............. 310/208; 310/51; 310/201; 310/63; 310/65; 310/59; 310/260
[58] Field of Search .............. 310/254, 179, 310/260, 270, 58, 59, 65, 64, 63, 62, 180, 206, 208, 207, 205, 204, 203, 202, 201, 200, 51

[56] References Cited

U.S. PATENT DOCUMENTS

| 714,721 | 2/1902 | Lundell | 310/203 |
| 1,784,815 | 12/1930 | Apple | 310/202 |
| 1,826,295 | 10/1931 | Apple | 310/201 |
| 2,836,744 | 5/1958 | Clawson | 310/208 |
| 3,321,653 | 5/1967 | Sonoyama | 310/180 |
| 3,324,322 | 6/1967 | Johns | 310/198 |
| 3,731,127 | 5/1973 | Harrington | 310/254 |
| 3,860,843 | 1/1975 | Kawasaki et al. | 310/67 |
| 4,307,311 | 12/1981 | Grozinger | 310/179 |
| 4,755,702 | 7/1988 | Iijima et al. | 310/166 |
| 4,847,526 | 7/1989 | Takehara et al. | 310/185 |
| 4,908,541 | 3/1990 | Kawazoe et al. | 310/270 |
| 5,122,705 | 6/1992 | Kusase et al. | 310/68 D |
| 5,561,334 | 10/1996 | Ishida et al. | 310/62 |
| 5,708,316 | 1/1998 | Ishida | 310/184 |
| 5,757,095 | 5/1998 | Ohmi et al. | 310/58 |

FOREIGN PATENT DOCUMENTS

| 1465068 | 1/1967 | France . |
| 55-157948 | 12/1980 | Japan . |
| 57-006551 | 1/1982 | Japan . |
| 59-127546 | 7/1984 | Japan . |
| 59-159638 | 9/1984 | Japan . |
| 62-272836 | 11/1987 | Japan . |
| 63-059744 | 3/1988 | Japan . |
| 64-005340 | 1/1989 | Japan . |
| 3027748 | 2/1991 | Japan . |
| 4079742 | 3/1992 | Japan . |
| 4024939 | 4/1992 | Japan . |
| 122741 | 2/1919 | United Kingdom . |
| 893853 | 4/1962 | United Kingdom . |
| WO 92/06527 | 4/1992 | WIPO . |

OTHER PUBLICATIONS

Noiyuki, AC Generator for Vehicle, Patent Abstracts of Japan, Jan. 13, 1982.

Masaru, Armature Coil for Rotary Electric Machine, Patent Abstracts of Japan, Jul. 23, 1984.

Toshiaki, AC Generator for Vehicle, Patent Abstracts of Japan, Sep. 10, 1984.

*Primary Examiner*—Nestor Ramirez
*Assistant Examiner*—Dang Dinh Le
*Attorney, Agent, or Firm*—Pillsbury Madison & Sutro LLP

[57] ABSTRACT

An alternator for a vehicle which maintains or improves the cooling performance and which reduces the fan noise caused by the interference between the cooling winds and the stator windings. An armature coil provided on a stator of the alternator includes an X-phase coil group, a Y-phase coil group, and a Z-phase coil group. Coil end groups are sets of coil ends forming bridge wires between slots. The coil end groups have stationary blade shapes which form passages for the cooling winds directed from a cooling fan on a rotor toward outlets in a frame. The sound of the interference between the cooling winds and the coil end groups is reduced while the cooling performance is enhanced.

26 Claims, 12 Drawing Sheets

STATIONARY BLADE

STATIONARY BLADE

STATIONARY BLADE

OUT GOING AIR FLOW

AIR FLOW BY COOLING FAN

STATIONARY BLADE

COOLING WIND

ALTERNATOR FOR VEHICLE

BACKGROUND OF THE INVENTION

1. Field of the Invention

This invention relates to an alternator for a vehicle.

2. Description of the Related Art

In a prior-art inner-fan-type alternator for a vehicle, a fan is provided on a rotor end face located radially inward of ends of armature windings projecting at opposite sides of a fixed iron core, and an air flow generated by the fan cools the ends of the armature windings. In the prior-art inner-fan-type alternator, the spacing between the fan and the ends of the armature windings is relatively narrow, and hence fan noise tends to be caused by a wind pressure which builds there and which is generated by fan blades.

In the prior-art inner-fan-type alternator, as shown in FIGS. 18 and 19, a group of the ends of the armature windings has a ruggedness (roughness) with a constant pitch which extends along a circumferential direction and which is caused by the interference between winding phases. Thus, the prior-art inner-fan-type alternator has the problem noise having a given audible frequency is generated. In addition, the prior-art inner-fan-type alternator has the problems that the overall fan noise and the pitch noise components are relatively great. The fan noise overall is abbreviated to the OA.

Japanese published examined patent application 4-24939 discloses that gaps extending in radial directions are formed between coil ends of units of respective phases provided in stator slots, and a cooling wind generated by a cooling fan flows along a circumferential direction.

Japanese published unexamined patent application 55-157948 discloses that at least two divided coils are provided in each of phases and are inserted into a slot. Thus, ruggedness in inner circumferential surfaces of the slot is reduced.

Japanese published unexamined patent application 4-79742 discloses a winding arrangement designed so that the ruggedness of a coil end group formed by two sets of three-phase armature windings will have unequal pitches.

In each of the above-mentioned prior-art structures, the inner circumferential surfaces formed by the coil end group is uneven, and the coil ends are not spaced so that they act as an interference body with respect to a cooling wind generated by the fan. Thus, rises and drops, that is, breathing conditions, occur in the pressure of a cooling wind, and a reduction of fan noise is insufficient.

In the structure disclosed by Japanese published examined patent application 4-24939, radial-direction spacings are maintained only at a pitch such that a group of three-phase coil ends is set as one unit. Thus, interference is insufficiently suppressed.

In the structure disclosed by Japanese published unexamined patent application 55-157948, the interference noise tends to be insufficiently suppressed while the ruggedness of the inner circumferential surfaces of the coil can be reduced.

In the structure disclosed by Japanese published unexamined patent application 4-79742, the frequency of the audible noise can be varied by changing the arrangement pitch of the ruggedness. The structure disclosed by Japanese published unexamined patent application 4-79742 tends to insufficiently reduce the noise caused by the interference.

There is a method of reducing fan noise by increasing the size of an alternator while decreasing the size of a cooling fan. According to this method, the cooling performance of the fan is reduced while the size of the alternator is increased.

SUMMARY OF THE INVENTION

This invention addressed the previously-mentioned problems in the prior art.

It is an object of this invention to provide an alternator for a vehicle which maintains or improves the cooling performance and which reduces the fan noise caused by the interference between the cooling wind and the stator windings.

In order to attain the above-mentioned object, coil end groups of this invention are made in shapes of stationary blades and thereby a flow of cooling medium is efficiently provided to improve the cooling performance thereof.

The present invention includes an alternator for a vehicle which comprises a frame, a stator iron core fixed to the frame and having a plurality of slots, a polyphase armature coil disposed in the slots, a stator in which an end of the stator iron core in an axial direction is formed with an annular coil end group as a set of a plurality of coil ends of the polyphase armature coil, and a rotor located so as to oppose the stator. The coil ends form shapes of stationary blades in the coil end group, and passages for cooling medium are formed between the shapes of the stationary blades which are formed by the coil ends.

The shapes of the stationary blades are thus formed by the coil ends, and the passages for the cooling medium are formed between the shapes of the stationary blades. Therefore, flows of the cooling medium are efficiently made, and the heat radiation at the coil ends is facilitated.

For example, in the case where the cooling medium uses air, a cooling wind generated by a cooling fan is made to smoothly pass through the coil end group. Thus, it is possible to remarkably reduce sound interference or noise interference caused by the coil end group. In addition, it is possible to reduce the OA and also the pitch noise. Furthermore, it is possible to increase the heat radiation area of the armature coil, and to improve the cooling performance.

The shapes of the stationary blades can be formed by arranging the plural coil ends.

According to this structure, the shapes of the stationary blades can be provided without being restricted by the shapes of electric conductors forming the coil ends, and the plural coil ends are arranged. Consequently, a body size as a coil end group is not made large.

The shapes of the stationary blades can be formed by making the cross sections of the coil ends into flat rectangular shapes.

According to this structure, it is possible to easily provide the shapes of the stationary blades, and it is possible to increase the surface area as one coil end.

It is preferable that the shapes of the stationary blades have a thickness corresponding to the thickness of the coil ends, and are made to extend along the directions of the flows of the cooling medium with a width equal to or greater than the thickness of the coil ends. According to this structure, the surfaces of the coil ends to be cooled can be made to sufficiently contact with the cooling medium, and the resistances to the flows of the cooling medium can be reduced and disturbances of the flows of the cooling medium can also be suppressed. Therefore, in the case where the cooling medium uses air, it is possible to improve the heat radiation performance, and to reduce the noise.

Here, the coil end can be made to correspond to a minimum unit of an electric conductor which is electrically insulated and is independently made. In this case, when the electric conductor has a circular cross section, its thickness corresponds to the diameter thereof. When the electric conductor has a flat rectangular cross section, its thickness corresponds to the dimension of the shorter sides thereof. When the electric conductor has an elliptical cross section, its thickness corresponds to the dimension of the shorter axis thereof.

There may be provided a structure in which the coil ends having circumferentially-extending portions which extend along a circumferential direction of the stator iron core, and radially-extending portions which extend along radial directions of the stator iron core, and the shapes of the stationary blades are formed by at least the radially-extending portions.

According to this structure, the coil ends have the radially-extending portions, and the shapes of the stationary blades are formed by the radially-extending portions. Thus, it is possible to provide passages extending along the radial directions. The radially-extending portions may be made into shapes also extending in an axial direction. The circumferentially-extending portions may be arranged as inner layer portions and outer layer portions at two sides of the radially-extending portions. The circumferentially-extending portions may be provided at only one side of the radially-extending portions.

It is preferable that the coil end group has passages and shapes of the stationary blades at a density which are approximately uniform throughout the circumference.

It is preferable that the coil end group has an arrangement of shapes of the stationary blades which has an approximately uniform shape throughout the circumference.

According to this structure, it is possible to provide a flow pattern with respect to the cooling medium which is uniform throughout the circumference of the coil end group. In the case where the cooling fan is used, it is possible to provide a low noise characteristic throughout the circumference with respect to winds, and also to provide a good heat radiation performance and a good cooling performance.

There may be provided a structure in which the rotor has a moving blade or moving blades for driving the cooling medium toward the coil end group. The moving blades are thus located near the coil end group, and it is possible to implement efficient flows of the cooling medium. Especially, in the case where the moving blades use a cooling fan, it is possible to provide an excellent low noise characteristic, a good heat radiation performance, and a good cooling performance.

There may be provided a structure in which two ends of the stator are formed with coil end groups respectively, and the rotor is formed with moving blades corresponding to the respective coil end groups. Thereby, it is possible to provide an advantage similar to that in the above-mentioned case regarding the coil end groups at the two ends of the stator.

The armature coil may include U-shaped segments having two straight line portions which are accommodated in different slots of the stator iron core, and U-shaped turn portions forming the coil end group at the end of the stator iron core. According to this structure, it is possible to improve the rate of occupation of the slots by the electric conductors. Since it can be easily made to manage the gaps between the coil ends in the coil end group, the shapes of the stationary blades can easily be formed.

There may be provided a structure in which the armature coil has a first three-phase connection coil and a second three-phase connection coil provided on a common stator iron core. The three-phase connection coils include short-pitch lap windings (short-pitch overlap windings) which are equal in connection conditions for the respective phases, and the phases of the three-phase connection coils are provided on the stator iron core in a manner such that they are different by $\pi/3$ (radian). This structure provides an arrangement in which the coil ends overlap each other less. In addition, it is possible to increase the surface area of the stationary blades, and hence it is possible to improve the cooling performance thereof. In the case where a cooling fan is used, it is possible to reduce the fan noise.

The stator may be designed so that the number of slots will be equal to 2 per pole and per phase. According to this structure, the coil ends can be arranged to have uniform gaps. In addition, the number of layers of the armature coil can be increased or doubled, and hence the surface area of the stationary blades can be increased. Therefore, it is possible to improve the cooling performance. In the case where a cooling fan is used, it is possible to reduce the fan noise.

At least parts of the coil end portions are formed by plate-like members, and are made into the stationary blades. Thus, the stationary blades cooperate with the moving blades on the rotor, and hence the armature coil can be efficiently cooled. In addition, since the stationary blade portions are made in shapes of plates, the cooling winds smoothly flow along the surfaces of the plate-like portions. Hence, it is possible to reduce the interference sound caused by the coil end group.

The coil end portions are made of plate-like conductors extending or spreading along the flow directions of the winds generated by the moving blades, and thereby the coil end portions can be effectively cooled without obstructing the flows of the cooling winds. In addition, it is possible to remarkably reduce the interference sound caused by the coil end portions.

The stationary blades can easily be formed by arranging projection portions projecting from bridge portions of the coil end portions. Thus, the cooling of the coil end portions and the reduction of the fan noise can be implemented by using the stationary blade portions.

The connection portions of the segments are used as the projecting portions which serve as the stationary blades, and thereby the ends of the segments can be used as cooling members and fan noise reducing members. In addition, the formation of the stationary blades is easily made, and the direction thereof can be easily adjusted.

The inner layer portions of the coil end portions near the moving blades on the rotor form the stationary blades, and thereby it is possible to increase the cooling performance of the coil ends and the effect of reducing the interference sound of the cooling winds.

Since the inner layer portions of the coil end portions regularly extend at a predetermined angle with respect to the direction of the rotation of the moving blades, the resistances to the flows of the cooling winds can be reduced by increasing the gaps between the adjacent inner layer portions. Accordingly, an improvement of the cooling performance is provided by an increase in the cooling air flow rates. In addition, since the cooling winds generated along the direction of the rotation of the moving blades flow along the inner layer portions, the heat radiation performance of the coil end portions can be enhanced.

At an outer side of the inner layer portions of the coil end portions, there is provided outer layer portions which intersect with the inner layer portions. Thus, it is possible to form coil end portions having a regular mesh-like configuration. The cooling of the coil end portions is implemented by exposing the mesh-like portion to the cooling winds generated by the moving blades. The fan noise can be reduced by covering the outer portions of the moving blades with the mesh-like portion.

In addition to the bridge portions corresponding to the inner layer portions and the outer layer portions of the coil end portions, the projecting portions are provided which project from the bridge portions. The projecting portions have an effect on cooling, and reduce the fan noise. Thus, the coil end portions can be remarkably decreased in temperature while the noise can be effectively reduced.

A plurality of segments are connected to form the armature coil, and the connection portions of the segments are used as projecting portions serving as the stationary blades. Thus, the formation of the stationary blades is easily made while the adjustment of the direction thereof is easily made.

The coil end portions are entirely formed by plate-like conductors, and the plate-like portions form fin members. The moving blades cooperate with the fin members. Thus, it is possible to efficiently cool the entirety of the coil end portions.

DESCRIPTION OF THE PREFERRED EMBODIMENTS

First Embodiment

Figure 4:
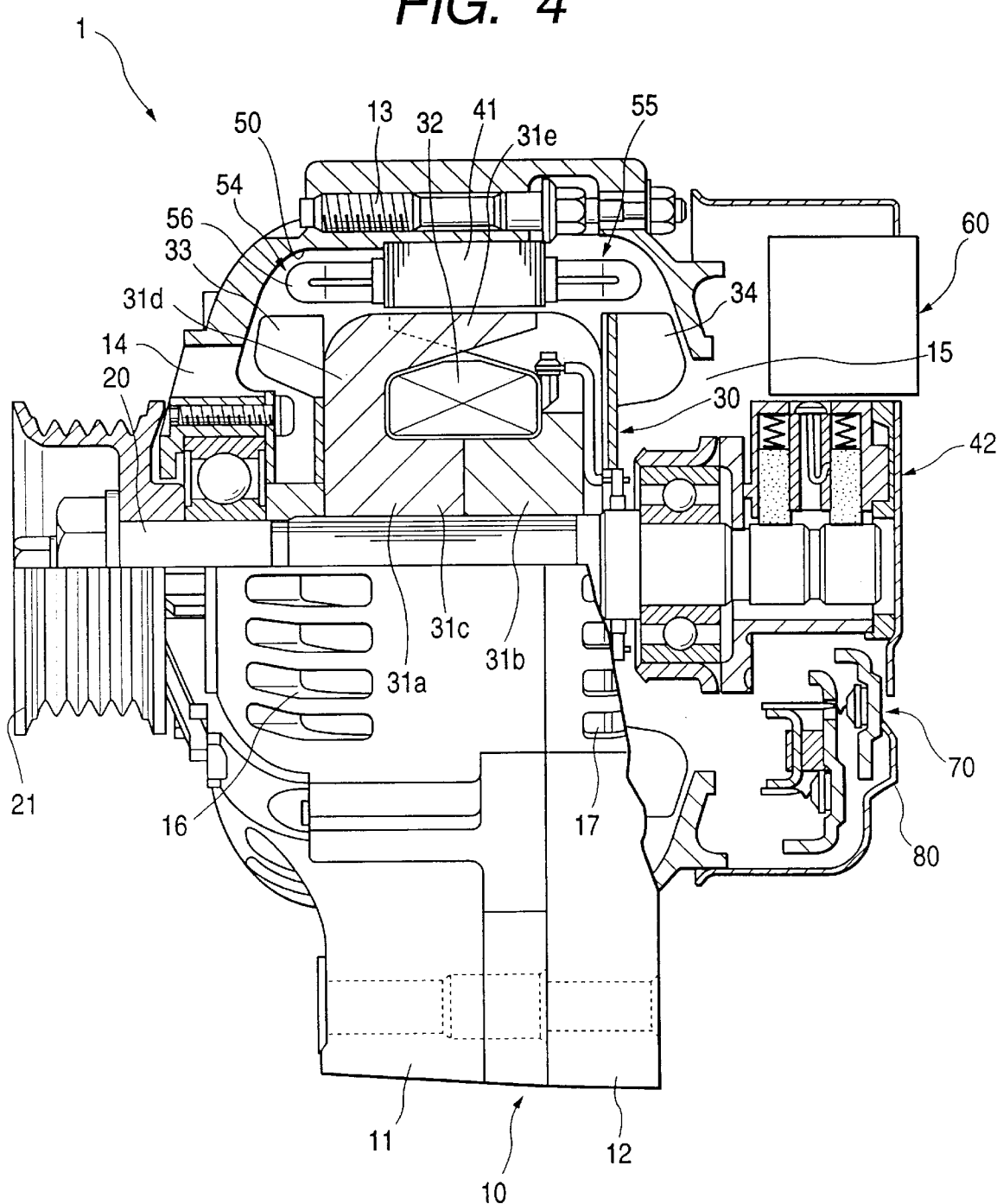
FIG. 4 is a view, partly in section, of an alternator for a vehicle to which this invention is applied.

FIG. 4 shows an alternator 1 for a vehicle according to a first embodiment of this invention.

With reference to FIG. 4, an alternator 1 for a vehicle includes a frame 10. The frame 10 has a front frame 11 and a rear frame 12 connected together by a plurality of connection bolts 13. The frame 10 has two ends in an axial direction which are formed with inlet openings 14 and 15 serving as inlets for cooling winds. On the other hand, the frame 10 has an outer circumferential surface in a radial direction which is formed with a plurality of outlet openings (outlet windows) 16 and 17 which serve as slit-like outlets for cooling winds in correspondence with radial-direction outsides of cooling fans explained later. The outlet openings 16 and 17 are parallel to each other with respect to circumferential directions.

A rotary shaft 20 is rotatably supported on the frame 10. A pulley 21 for receiving a power from an engine is fixed to a front portion of the rotary shaft 20. A rotor 30 is fixed to a central portion of the rotary shaft 20. A rear portion of the rotary shaft 20 is provided with a current collector 42 for supplying a field current to a field coil 32. The current collector 42 includes a slip ring and a brush.

The rotor 30 has a pole core 31 of the LUNDEL type, and a field coil 32 provided on the pole core 31. The pole core 31 includes a pair of claw poles 31a and 31b. Each of the claw poles 31a and 31b includes a boss portion 31c fitted into and fixed to the rotary shaft 20, a disk portion 31d extending and spreading from the boss portion 31c in radially outward directions, and a claw-like magnetic pole portion 31e extending from the disk portion 31d in an axial direction. In FIG. 4, only these portions of the claw pole 31a are denoted by the characters 31c, 31d, and 31e.

Cooling fans 33 and 34 serving as moving blades are fixed to the faces of two ends of the rotor 30 in an axial direction. The front cooling fan 33 includes a fan blade serving as a centrifugal fan and a fan blade serving as a mixed flow fan. The fan blade of the mixed flow fan is provided approximately in positional agreement with a U-shaped opening which is formed in the disk portion 31d in correspondence with the region between the claw-like magnetic pole portions 31e. On the other hand, the rear cooling fan 34 has fan blades each serving as a centrifugal fan.

A stator 40 is located radially outward of the rotor 30. The stator 40 opposes the rotor 30. The stator 40 is fixed to the frame 10. The stator 40 has an iron core 41. The stator iron core 41 has steel plates laminated by a predetermined thickness. The stator iron core 41 has a shape of a cylinder. The stator iron core 41 has inner circumferential surfaces formed with a plurality of slots.

An armature coil 50 is wound on the stator 40. The armature coil 50 is made of a wire (a copper wire) coated with an organic insulating film. The copper wire has, for example, a circular cross-section. The armature coil 50 has portions accommodated in the slots, and coil end groups 54 and 55 exposed at the two ends of the stator 40 in the axial direction. The portions accommodated in the slots are referred to as the accommodated portions.

Figure 1:
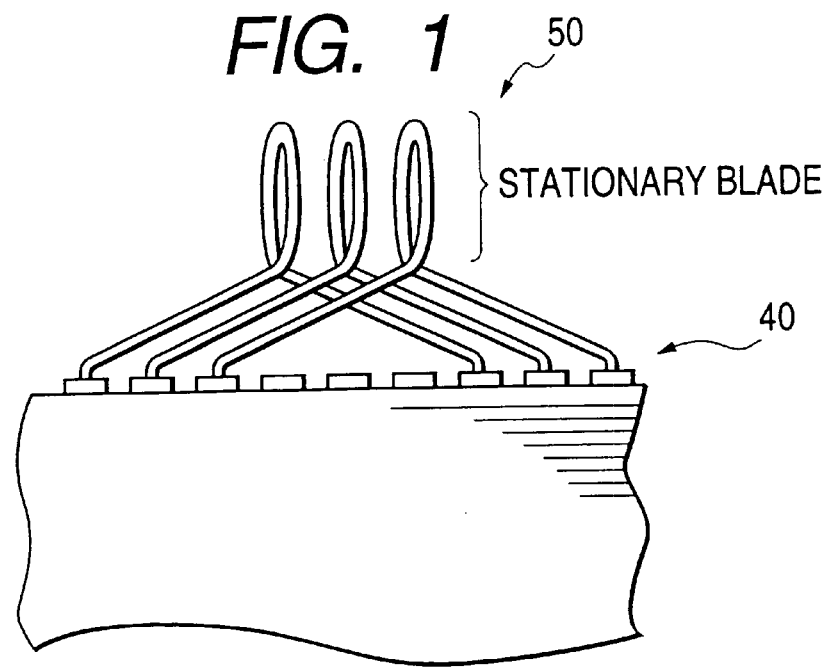
FIG. 1 is a diagram showing the shape of a coil end group in this invention.
Figure 2:
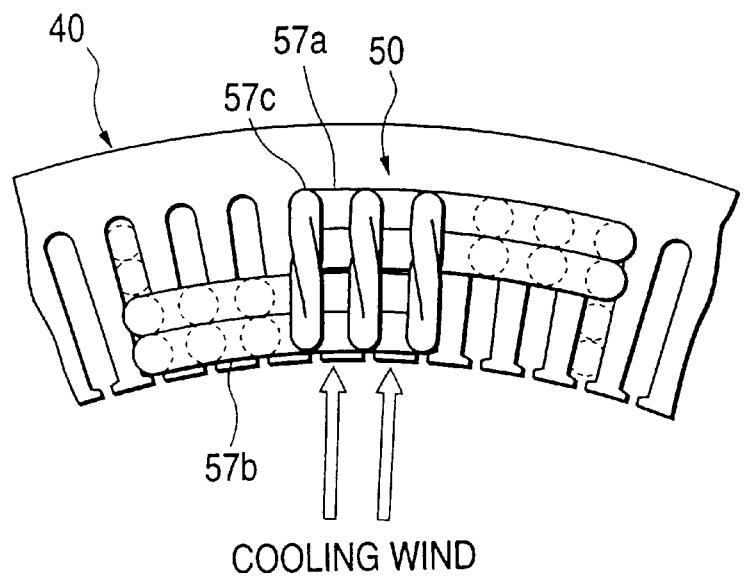
FIG. 2 is a plan view, in an axial direction, showing the shape of the coil end group in this invention.
Figure 3:
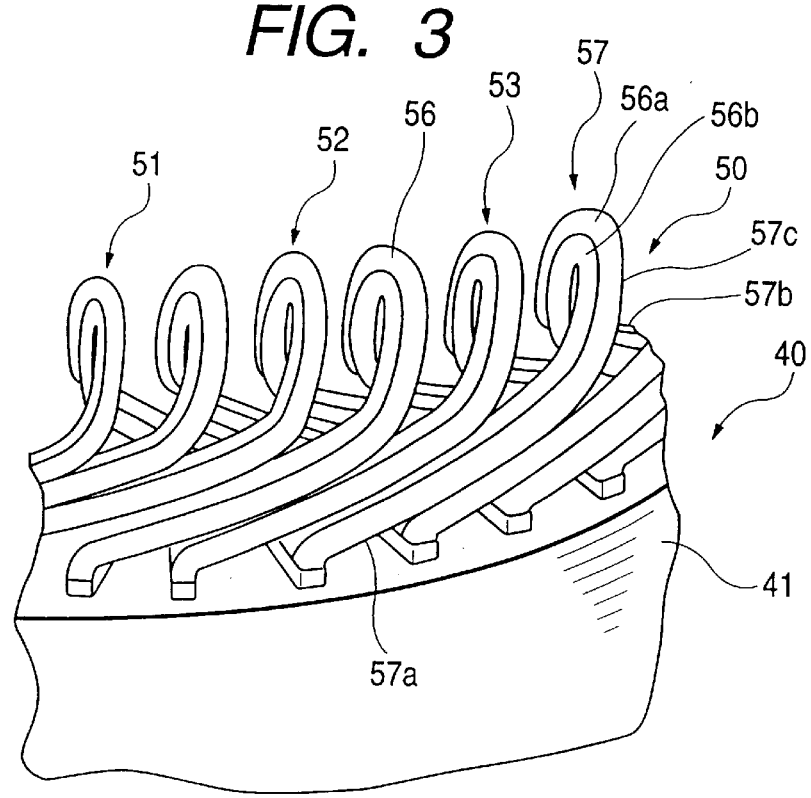
FIG. 3 is a perspective view showing the shape of the coil end group in this invention.

FIG. 1 shows the stator 40 and the armature coil 50 as viewed in a radial direction. In FIG. 1, there is shown a unit for a recurrence of three coil ends. FIG. 2 shows the stator 40 and the armature coil 50 as viewed in an axial direction. In FIG. 2, there is shown a unit for a recurrence of three coil ends. FIG. 3 perspectively shows the stator 40 and the armature coil 50.

The armature coil 50 includes an X-phase coil group 51, a Y-phase coil group 52, and a Z-phase coil group 53 corresponding to the respective phases of the three-phase alternator. The coil end groups 54 and 55 are sets of coil ends 56 being bridge wires between the slots. Two coils (two windings) are provided on a bundled basis for each phase. Thus, four coils (four windings) are inserted into one slot.

A voltage adjusting circuit 60 and a rectifying circuit 70 are mounted on an outer side of the rear frame 12, and are covered with a plate-like cover 80.

Basic operation of the alternator of FIG. 4 is as follows. When the rotor 30 is rotated by the engine, a field current is supplied from the voltage adjusting circuit 60 to the field coil via the current collector 42. Thereby, a rotating field is caused, and an alternating current power is generated in the armature coil 50 provided on the stator 40. The alternating current power is rectified by the rectifying circuit 70 into a direct current power which is outputted therefrom.

The cooling fans 33 and 34 rotate in accordance with the rotation of the rotor 30, drawing air from the two ends in the axial direction and discharging the air in the radially outward directions.

In the front side, cooling air is introduced via the inlet opening 14. A flow of the cooling air is divided into a first flow directed toward the coil end group 54, and a second flow moving along the claw-like pole 31e in the axial direction and cooling the rotor 30. At this time, a portion of the air is forced by a side wall surface of the U-shaped opening in the disk portion 31d of the front claw pole 31a to flow in the radially outward directions and to be directed toward the coil end group 54.

In the rear side, air passes through a plurality of openings formed in the cover 80, cooling the voltage adjusting circuit 60, the rectifying circuit 70, and the current collector 42 before entering the inlet 15. The cooling air is made to flow toward the coil end group 55. At the same time, the cooling air which has passed through the region between the claw-like poles 31e is forced by a side wall surface of the U-shaped opening in the disk portion 31d of the rear claw pole 31b to flow in the radially outward directions and to be directed toward the coil end group 55.

Each of the cooling fans 33 and 34 serve as cooling means. The cooling winds, which are generated by the cooling fans 33 and 34 cool the entirety of the structural parts of the alternator 1 for the vehicle. Especially, the cooling winds cool the coil ends 56, which compose the coil end groups 54 and 55, while flowing toward the outlets 16 and 17.

Next, an explanation will be given of the structure of the coil end groups 54 and 55, and the reduction of the fan noise.

As shown in FIG. 4, the coil end groups 54 and 55 are located in paths of the cooling winds directed from the cooling fans 33 and 34 toward the outlets 16 and 17. The coil end groups 54 and 55 are close to the outer circumferential portions of the cooling fans 33 and 34, and are arranged immediately following air outlet sides thereof. End portions of the coil end groups 54 and 55 in the axial direction are approximately centered at the heights of the cooling fans 33 and 34 in the axial direction.

As shown in FIGS. 1 to 3, the coil end groups 54 and 55 are sets of plural coil ends 56. As shown in FIG. 3, regarding each coil end 56, two coil ends 56a and 56b are arranged in parallel to form a belt-like member 57. Thus, the belt-like member 57 has a thickness corresponding to the diameters of the coil ends 56a and 56b. The belt-like portion 57 has a width greater than the diameters of the coil ends 56a and 56b. The coil ends 56a and 56b are unit electric conductors which are insulated from each other, and which have circular cross sections. This design can be provided by bundling a plurality of electric conductors in advance, and then winding them on the stator iron core 41 on a lap basis (an overlap basis).

As shown in FIG. 2, two belt-like members 57 are located in one slot, and hence four electric conductors are located in one slot.

One belt-like member 57 has two inclined portions 57a and 57b, and a turn portion 57c. The inclined portions 57a and 57b extend along the circumferential direction of the stator iron core 41. The turn portion 57c extends upward in the axial direction, bending or curving in the radial direction. The inclined portion 57a is located at an outer side in the radial direction while the inclined portion 57b is located at an inner side in the radial direction. The turn portion 57c extends between the inclined portions 57a and 57b.

In this embodiment, one belt-like member 57 forms a bridge extending between different slots. At an end surface of the stator iron core, 41, the belt-like member 57 has a construction pattern such that it extends from the inner side of one slot and then enters the outer side of another slot. A plurality of belt-like members located at one end surface of the stator iron core 41 have equal shapes and equal construction patterns.

The belt-like members 57 are spaced from each other by suitable clearances or gaps, and thus air passages are formed therebetween. The widthwise directions of all the outer layer inclined portion 57a, the inner layer inclined portion 57b, and the turn portion 57c of the belt-like member 57 are made into agreement with the radial direction of the stator 40. Therefore, the belt-like member 57 provides a small projection area with respect to the radial direction of the stator 40, and provides a wide area along the radial direction.

Regarding this shape, a plurality of belt-like members 57 are located in parallel with the radial direction, and form stationary blades with respect to the cooling fans 33 and 34. Thus, the pressures of cooling winds generated by the cooling fans 33 and 34 are released toward the outlet openings 16 and 17 in the outer circumferential portion of the frame 10. As the rotor 30 rotates, the cooling winds are generated by air drive arrangements including the cooling fans 33 and 34 and the claw-like magnetic poles of the rotor 30. The cooling winds flow along the belt-like members 57 formed by the coil ends 56. Therefore, a wide region of the surfaces of the coil ends 56 can be uniformly cooled. In addition, the sound of the interference between the cooling winds and the coil ends 56 can be remarkably reduced.

The coil end groups 54 and 55, which are sets of plural belt-like members 57, are formed by a recurrence of belt-like members having equal shapes throughout the circumference. Thus, the coil end groups 54 and 55 provide resistances to air flows which are uniform throughout the circumference. In addition, the coil end groups 54 and 55 provide guide angles with respect to the cooling winds which are uniform throughout the circumference. Therefore, it is possible to reduce reflection waves caused by collision of the cooling winds against the coil ends.

Particularly, the turn portions 57c provide belt-like portions extending along the radial directions at ends of the coil end groups 54 and 55 in the axial direction. Thus, it is possible to provide stationary blades which enhance the air flow efficiency regarding the cooling winds from the cooling fans 33 and 34, and which implement noise reduction.

It is preferable that all the coil ends in the coil end groups are exactly the same in shape, and are uniformly arranged with a high degree of precision. In fact, the coil ends partially have irregular shapes, and a part of the arrangement of the coil ends has an irregular shape. Such an irregularity is caused by errors in manufacture steps, wire connections between the phases, and removing outputs of the polyphase armature coil. The partial irregularity having such a degree does not provide a significant difference in performance. Accordingly, the irregularity having such a degree is within an allowable range. Although the coil end groups have such irregularities, the coil end groups formed by arranging the coil ends can regarded as having substantially equal shapes throughout the circumference. Substantially, the coil end groups provide resistances to air flows, and have densities which are uniform throughout the circumference.

The cooling fans 33 and 34 may use fan blades having shapes of flat plates, or fan blades having curved surfaces. In the cooling fans 33 and 34, plural fan blades may be arranged at an equal pitch or an unequal pitch. There may be provided only one cooling fan located at one end surface of the rotor 30, and only one coil end group which opposes the cooling fan may be made into a stationary blade shape such as mentioned above. According to such a structure, air flows in the coil end group is efficiently made, and it is possible to provide advantages such as noise reduction and improvement of the heat radiation performance. Thus, it is important that at least one of the coil end groups formed at the two end surfaces of the stator iron core has a shape related to this invention.

Other Embodiments

Figure 5:
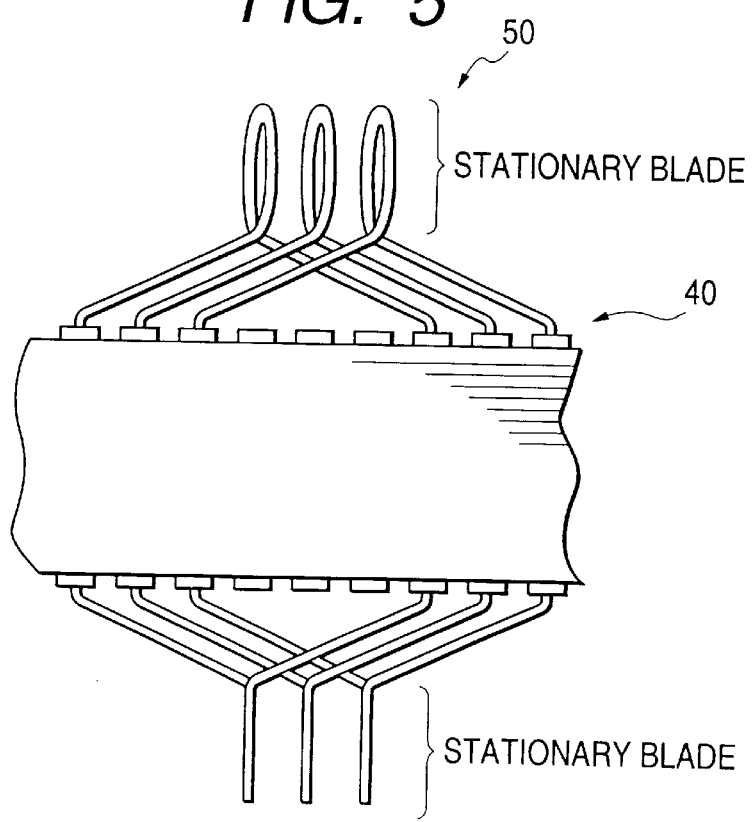
FIG. 5 is a diagram showing the shape of a coil end group in another embodiment of this invention.

In the first embodiment of this invention, the coil end groups 54 and 55 have equal shapes. On the other hand, as shown in FIG. 5, the coil end groups 54 and 55 may have different shapes, and may provide stationary blade shapes having different characteristics. According to this structure, it is possible to provide stationary blade shapes adapted to air flow characteristics of the front and the rear of the stator iron core. Only the turn portions 57c may be made into stationary blade shapes. According to this structure, it is possible to reduce the noise and to improve the heat radiation performance at the ends of the coil end groups in the axial direction while reducing the heights of the coil end groups in the axial direction.

Only one of the coil end groups 54 and 55 shown in FIG. 4 may have stationary blade shapes. In this case, the other coil end group can be made into a shape such that the plural coil ends are arranged without gaps therebetween. According to this structure, the alternator 1 can be reduced in size in correspondence with required specifications while the advantages of the improvement of the heat radiation performance and the noise reduction are maintained.

In another embodiment of this invention, approximately U-shaped segments having flat rectangular cross sections are used to form an armature coil. A plurality of approximately U-shaped segments are mounted on the stator iron core 41. At one end surface of the stator iron core 41, U-shaped turn portions form coil ends. At the other end surface of the stator iron core 41, two ends of each U-shaped segment are connected to ends of other segments to form coil ends. Thereby, the coil end portions can easily provide stationary blade shapes which cooperate with the cooling fans serving as moving blades.

Figure 6:
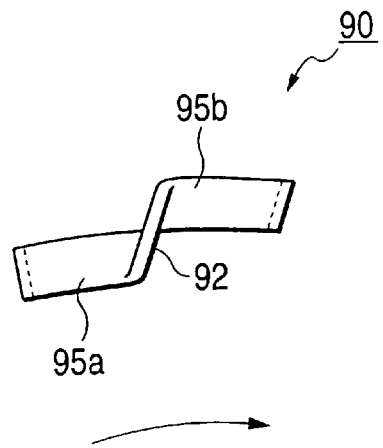
FIG. 6 is a plan view of an substantially U-shaped segment.
Figure 7:
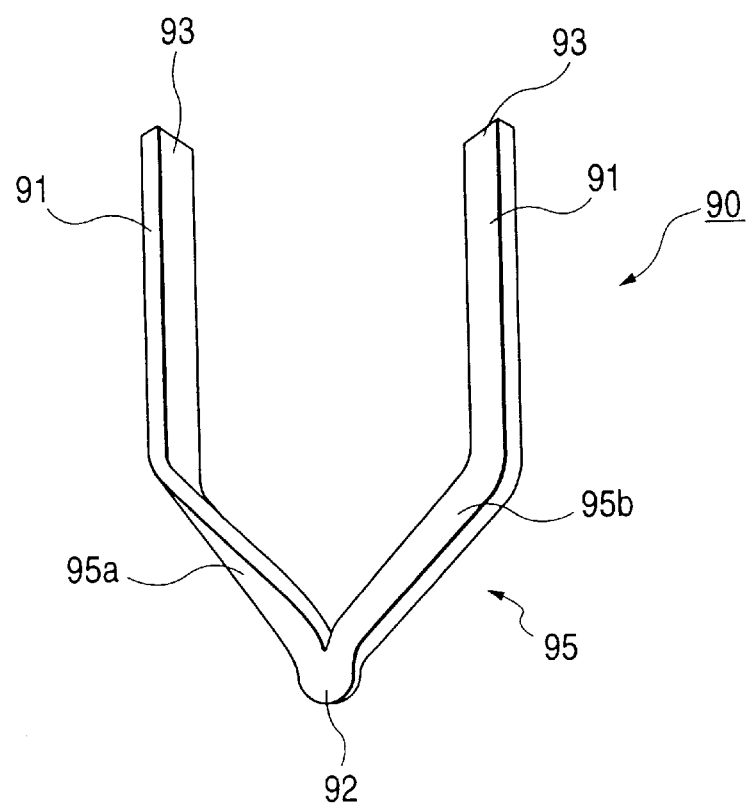
FIG. 7 is a diagram of an substantially U-shaped segment.

For example, as shown in FIGS. 6 and 7, a segment 90 is composed of a U-shaped electrically-conductive wire having a flat rectangular cross section. The segment 90 has two straight line portions 91, and a bridge portion 95 connecting the straight line portions 91. The straight line portions 91 are accommodated portions. The straight line portion 91 has a fold portion 92 approximately at its center. As shown in FIGS. 8 to 11, the segment 90 is inserted into stator slots in a manner such that one straight line portion 91 is placed in an inner radial side of a slot in the stator iron core while the other straight line portion 91 is in an outer radial side of another slot in the stator. Since one of the two straight line portions 91 is inserted into the inner radial side of a slot while the other straight line portion 91 is inserted into the outer radial side of another slot, the halves of the bridge portion 95 which are separated at the fold portion 92 form an inner layer portion 95a and an outer layer portion 95b respectively. The inner layer portion 95a is close to the cooling fan on the rotor while the outer layer portion 95b is remote therefrom.

Figure 11:
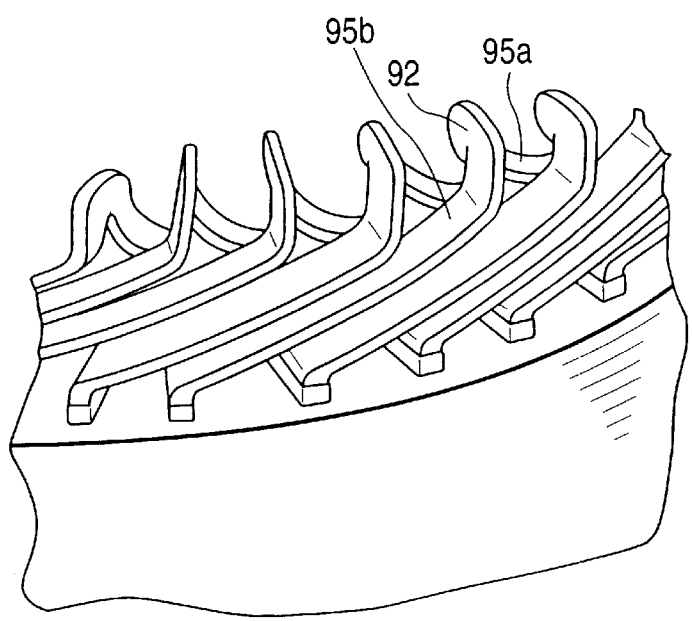
FIG. 11 is a perspective view showing the shape of a coil end group in another embodiment of this invention.

In this way, there is formed a coil end group at one end surface of the stator 40 as shown in FIG. 11. The coil end group is formed by an arrangement of bridge portions 95 of U-shaped segments 90. Each coil end has an inner layer portion 95a, an outer layer portion 95b, and a fold portion 92. The inner layer portion 95a and the outer layer portion 95b are circumferentially-extending portions which extend obliquely in the axial direction along the circumferential direction of the stator 40. The fold portion 92 is a radially-extending portion which extends along the radial direction of the stator 40 to connect the inner layer portion 95a and the outer layer portion 95b.

Figure 8:
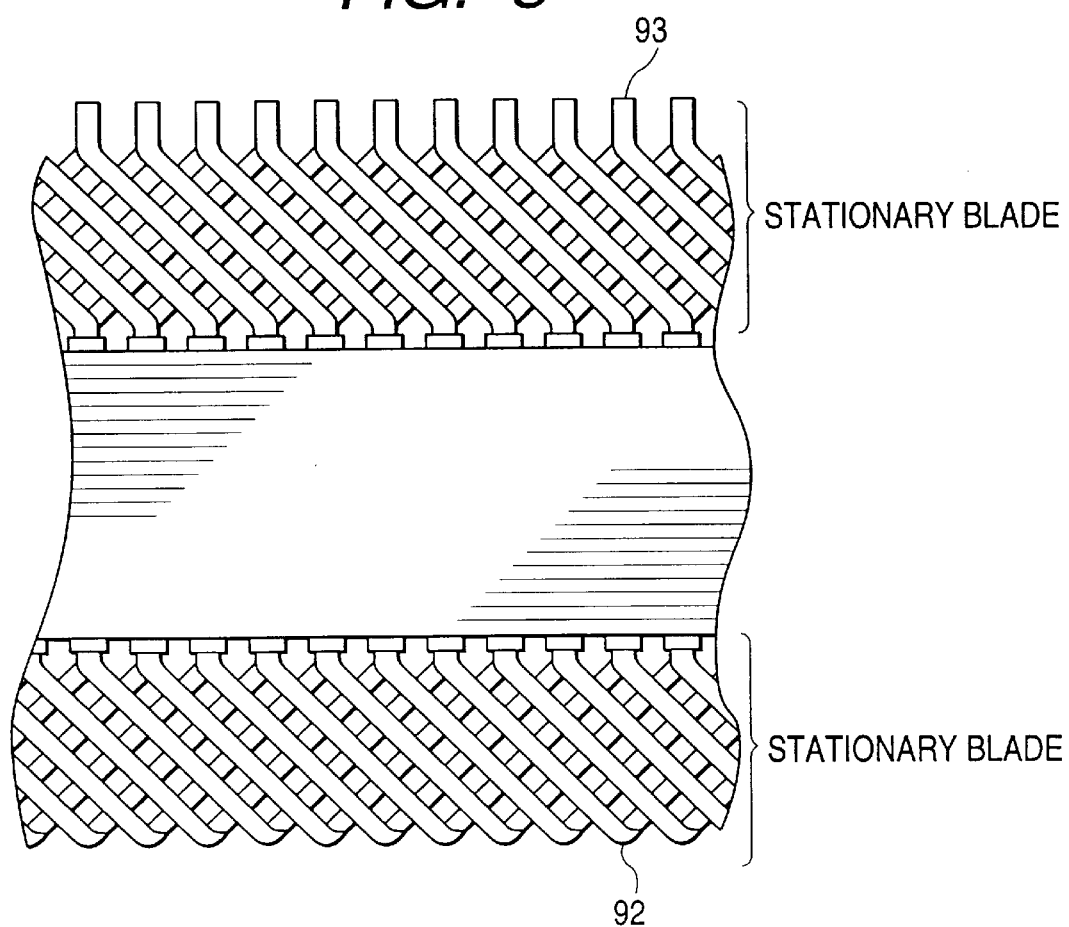
FIG. 8 is a diagram showing the shape of a coil end group in another embodiment of this invention.
Figure 9:
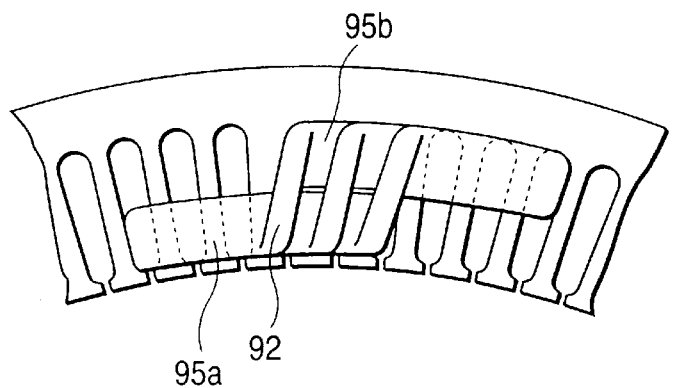
FIG. 9 is a plan view, in an axial direction, showing the shape of a coil end group in another embodiment of this invention.
Figure 10:
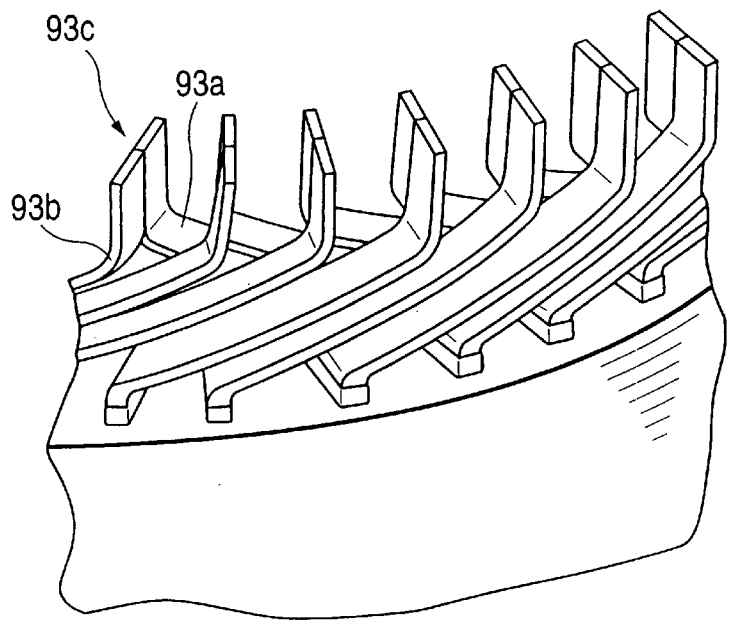
FIG. 10 is a perspective view showing the shape of a coil end group in another embodiment of this invention.

At the other end surface of the stator 40, there is formed a coil end group as shown in FIG. 10. Ends of two straight line portions 91 of a segment 90 project from different slots, respectively. As shown in FIG. 8 or FIG. 10, these ends are bent so that an inner layer portion and an outer layer portion will be inclined in opposite directions along the circumferential direction of the stator. The ends of the segment 90 are connected to ends of other segments in different layers which project from other slots distant therefrom by predetermined pitches.

For example, the inner layer portion 93a of one segment is connected to an outer layer portion 93b of another segment. For the connection between the inner layer portion 93a and the outer layer portion 93b, there is formed a projecting portion 93c which projects in the axial direction from the bridge portion composed of the inner layer portion 93a and the outer layer portion 93b. The connection between the ends of the segments at the projecting portion 93c is implemented by ultrasonic welding, arc welding, soldering, brazing, mechanical processing, or caulking in order to implement electrical connection and to provide a predetermined mechanical strength.

Thus, each coil end has an inner layer portion 93a, an outer layer portion 93b, and a projecting portion 93c. The inner layer portion 93a and the outer layer portion 93b are circumferentially-extending portions which extend obliquely in the axial direction along the circumferential direction of the stator 40. The projecting portion 93c is a radially-extending portion which extends along the radial direction of the stator 40 to connect the inner layer portion 93a and the outer layer portion 93b.

In the embodiment of FIGS. 8 to 11, two electric conductors are accommodated in one slot in the stator 40.

In this embodiment, the cross sections of electric conductors forming the armature coil are made in rectangular shapes, and the entirety of all the portions corresponding to the coil ends provide stationary blade shapes. Therefore, it is possible to improve the heat radiation performance and to reduce the noise. According to this structure, the surface area of the armature coil which is exposed to the cooling winds from the cooling fans can be increased, and hence the heat radiation can be facilitated and the cooling performance can be enhanced. In addition, the sound of the breaking of winds by the coil ends can be reduced, and hence noise reduction is available.

In this embodiment, among the portions of one coil end, the fold portion 92 or the projecting portion 93c which forms an axial-direction end separated from the stator iron core has an area and an inclination angle (a skew angle) effective as a stationary blade. At an end of the coil end in the axial direction, that is, at the tip thereof, electric conductors are arranged at inclination angles (skew angles) along the directions of the winds from the cooling fans. At an end of the coil end in the axial direction, there is a low cooling effect caused by the conduction of heat to the stator iron core. The low cooling effect can be compensated, and a high cooling performance is available. The tips of the coil ends in the axial direction are exposed to relatively strong winds from the cooling fans on the rotor. By making these portions into stationary blade shapes, it is possible to reduce the noise.

In this embodiment, among the portions of the coil ends, the inner layer portions 95a and 93a, which are inner layer portions located at the inner side of the stator iron core in the radial direction, have shapes as stationary blade shapes. Therefore, stationary blades are located near the cooling fans which serve as moving blades provided on the rotor.

According to this embodiment, regarding one coil end having an inner layer portion and an outer layer portion, the inner layer portion is located in a front side with respect to the direction of the rotation of the cooling fan 33 or 34 corresponding to the moving blades while the outer layer portion is located in a rear side. Therefore, one coil end can easily provide a stationary blade shape inclined along the direction of the rotation of the cooling fan.

Especially, at the fold portion 92 which is formed by bending the rectangular conductor, there is provided a shape in which the inner layer portion is smoothly and continuously connected to the outer layer portion. Similarly, at the projecting portion 93c which is formed by connecting the flat plate conductors, there is provided a shape in which the inner layer portion is smoothly and continuously connected to the outer layer portion. Therefore, it is possible to provide a stationary blade shape inclined along the direction of the rotation of the cooling fan.

In this embodiment, the electric conductor uses a flat rectangular copper wire having a cross section about which its width is greater than its thickness, and a stationary blade is provided by the flat surfaces of the flat rectangular copper wire. Thus, a simple structure can provide a stationary blade. In addition, the entire of coil end bridged between one slot and another slot provides a stationary blade.

Furthermore, the armature coil is composed of a plurality of segments, and thereby the coil end portions having stationary blade shapes can be easily formed.

In this embodiment, at one end surface of the stator iron core, a plurality of coil ends are arranged in a ring, and there is formed a set of coil ends, that is, a coil end group. There are provided gaps or clearances between almost all the coil ends, and almost all the coil ends serve as stationary blades disposed in the flows of winds from the cooling fan. Thus, substantially the entire areas of the coil ends are in contact with the cooling air fed by the cooling fan. Furthermore, almost all the coil ends which are located at one end surface of the stator iron core have equal shapes.

Accordingly, in the coil end group, the coil ends are located at a density which is uniform throughout the circumference thereof. In addition, since the coil ends are arranged so that the longitudinal directions of the cross sections thereof will be along the radial directions, the resistance to the air flows regarding the radial direction is lower than that regarding the circumferential direction. The coil ends having the equal shapes are arranged, and consequently the coil end group provides stationary blades having inclination angles (skew angles) and resistances to the air flows which are uniform throughout the circumference. Thus, by using the stationary blades in the alternator for the vehicle which includes the cooling fan at the end of the rotor, a higher cooling performance can be provided by the cooling fan. In addition, noise reduction is available.

The coil end group has a fine mesh-like configuration, and surrounds the cooling fan 33 or 34. Thus, the coil end group serves as a mesh-like wind screen, and provides an effect of reducing the interference sound related to the winds.

At the two end surfaces of the stator iron core, there are formed similar coil end groups. Thus, at the two ends of the stator iron core, there are benefits provided by the stationary blades. As a result, by using the stationary blades in the alternator for the vehicle which includes the cooling fans at the ends of the rotor, higher cooling performances can be provided by the two cooling fans. Especially, the two coil end groups can be uniformly cooled. In addition, it is possible to reduce the air drive noise caused by the two cooling fans.

In the embodiment of FIGS. 8 to 11, two electric conductors are placed in one slot of the stator 40. Four electric conductors may be placed in one slot. In this case, an advantage similar to the advantage provided by the above-mentioned embodiments is available.

Figure 12:
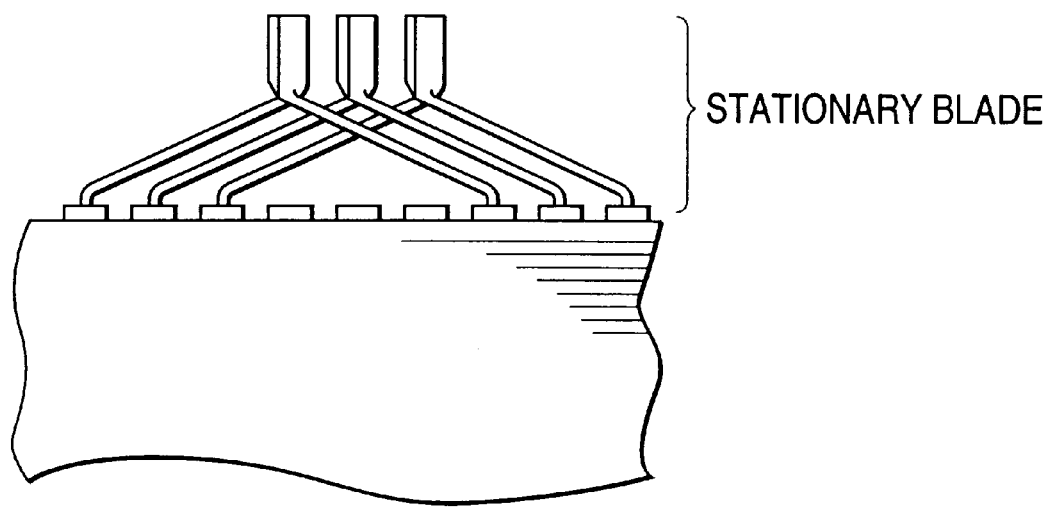
FIG. 12 is a diagram showing an example of a modification of the shape of a coil end group in another embodiment of this invention.
Figure 13:
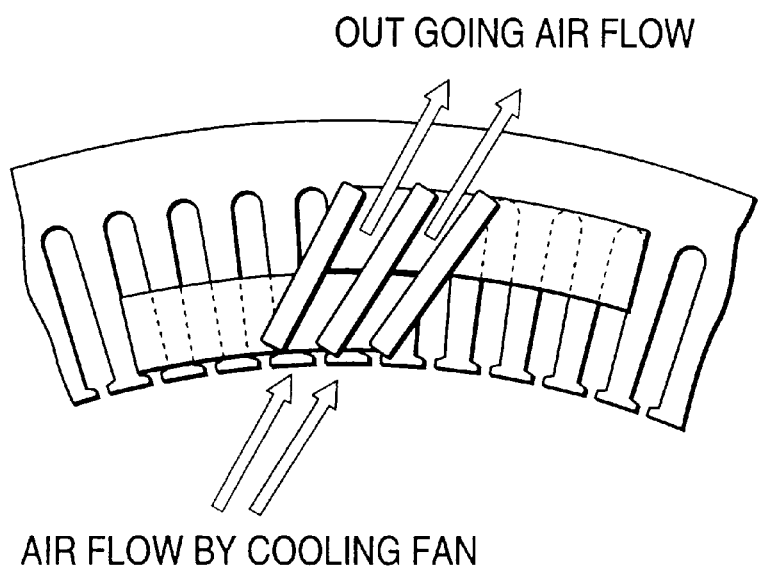
FIG. 13 is a plan view, in an axial direction, showing an example of a modification of the shape of a coil end group in another embodiment of this invention.

As shown in FIGS. 12 and 13, it is easy to change the inclination angles (the skew angles) of the stationary blade portions of the segments. Thus, the angles of the stationary blade portions can be suitably changed in accordance with the directions of the cooling winds discharged by the cooling fans on the rotor.

Next, a description will be given of ways of winding electrically conductive wires and ways of connecting them to form a polyphase coil which can be used in the above-mentioned embodiments.

The above-mentioned embodiments can use various winding methods to form the armature coil 50. For example, the manner of the winding is wave winding, lap winding, concentrated winding, or distributed winding. The winding pitch is not limited to that of the full-pitch winding.

A typical example of the manner of the winding will be described with reference to FIGS. 14 and 15A–15B.

Figure 14:
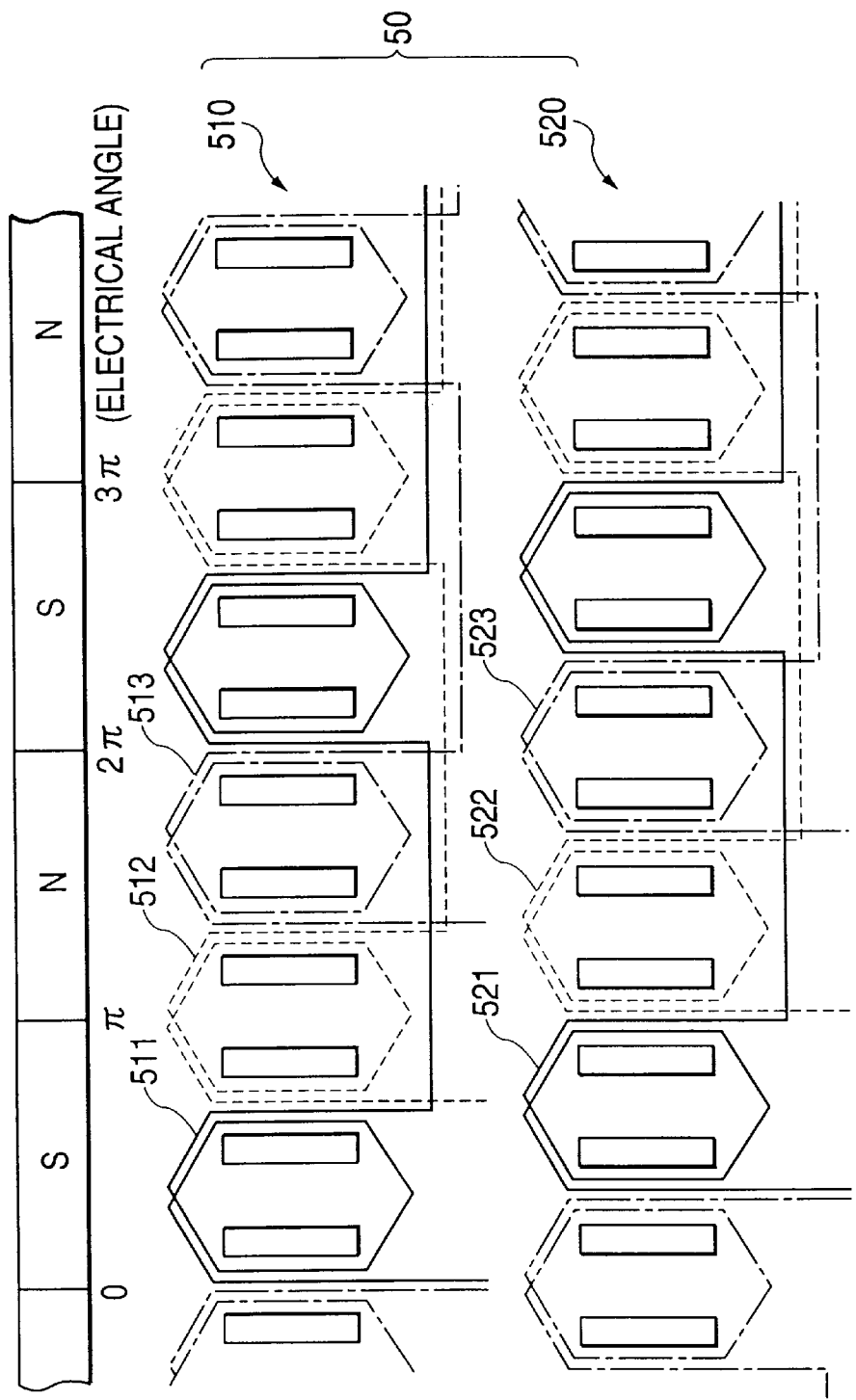
FIG. 14 is a diagram of the structure of a winding in this invention.

FIG. 14 shows two groups of armature coils provided on a same stator iron core which are illustrated as being divided into two to facilitate an easy understanding. The armature coil 50 has a first polyphase coil group 510 and a second polyphase coil group 520. The first polyphase coil group 510 includes a plurality of coils 511, 512, and 513 provided on the stator iron core as short-pitch lap windings which correspond to the magnetic pole pitch of the rotor. The coils 511, 512, and 513 are connected in polyphase to form a polyphase coil. The second polyphase coil group 520 includes a plurality of coils 521, 522, and 523 provided on the stator iron core as short-pitch lap windings which correspond to the magnetic pole pitch of the rotor. The coils 521, 522, and 523 are connected in polyphase to form a polyphase coil. Furthermore, one coil in the first polyphase coil group 510, and one coil in the second polyphase coil group 520 which generates a phase output corresponding thereto are shifted or offset from each other by $\pi/3$ (radian). In FIG. 14, there are three phases.

Figures 15A, 15B:
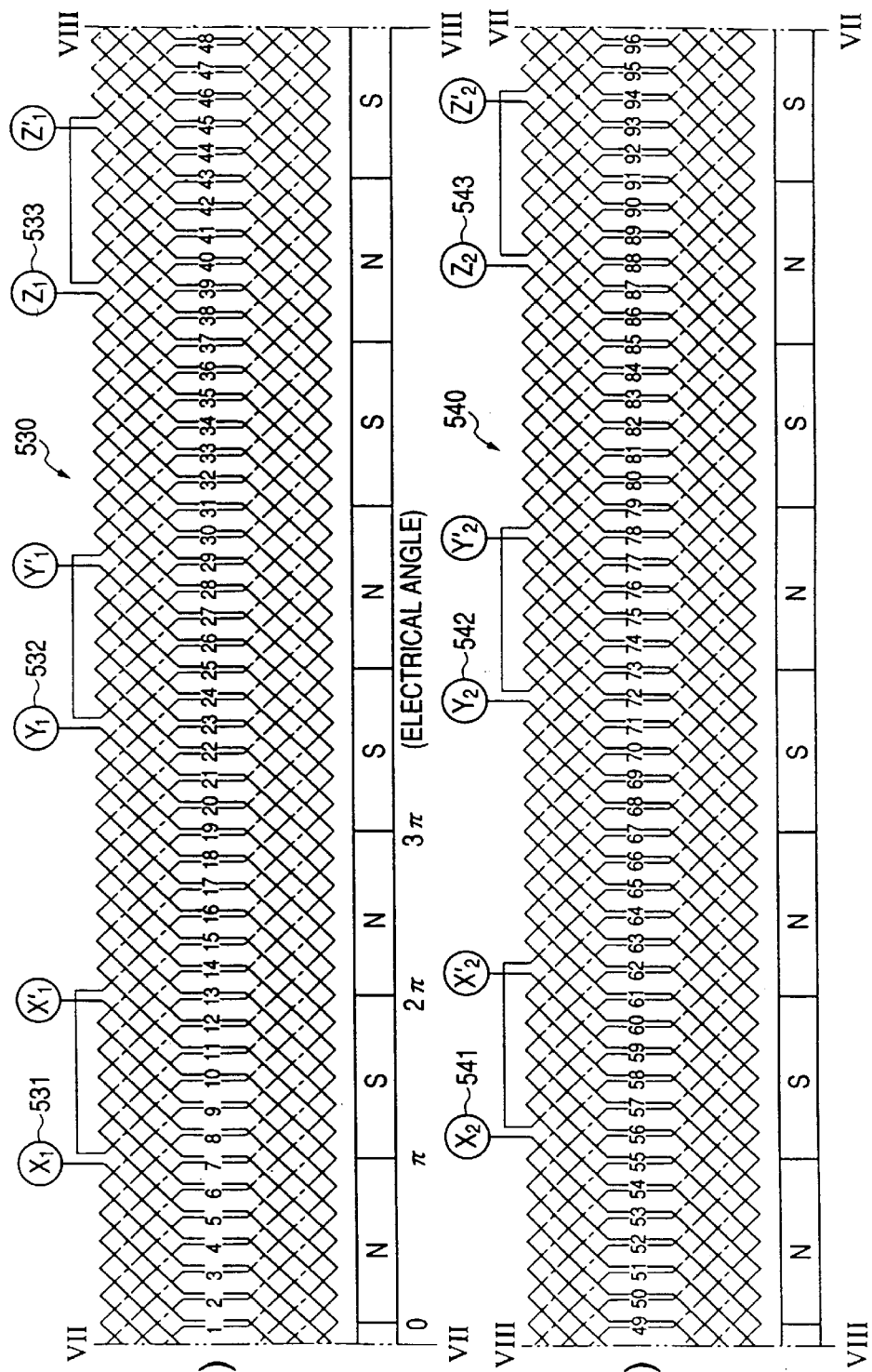
FIGS. 15A and 15B are diagrams of the structure of a winding in this invention.

FIGS. 15A–15B show an example of the specifications of the winding which are used in the case where the number of stator slots is two per pole and per phase. The wires in FIG. 15(A) and the wires in FIG. 15(B) are connected at the VII—VII line and the VIII—VIII line. FIG. 15 shows the armature coil 50 which is arranged in a ring.

In this embodiment, there are twelve teeth between slots of the stator iron core with respect to the two magnetic pole pitch of the rotor. The armature coil 50 has a first polyphase coil group 530 and a second polyphase coil group 540. The first polyphase coil group 530 includes a plurality of coils 531, 532, and 533 provided on the stator iron core as wave windings which correspond to the magnetic pole pitch of the rotor. The coils 531, 532, and 533 are connected in polyphase. The second polyphase coil group 540 includes a plurality of coils 541, 542, and 543 provided on the stator iron core as wave windings which correspond to the magnetic pole pitch of the rotor. The coils 541, 542, and 543 are connected in polyphase. Furthermore, one coil in the first polyphase coil group 530, and one coil in the second polyphase coil group 540 which generates a phase output corresponding thereto are shifted or offset from each other by $\pi/6$ (radian). In FIGS. 15A–15B, there are three phases.

The electric conductor which forms the armature coil in the above-mentioned embodiments can use a copper wire coated with an organic insulating film. A bare copper wire may be used. In this case, an organic insulating film is applied to the bare copper wire to provide necessary insulation. The shape of the cross section of the electric conductor is, for example, circular, flat rectangular, or polygonal.

Figure 16:
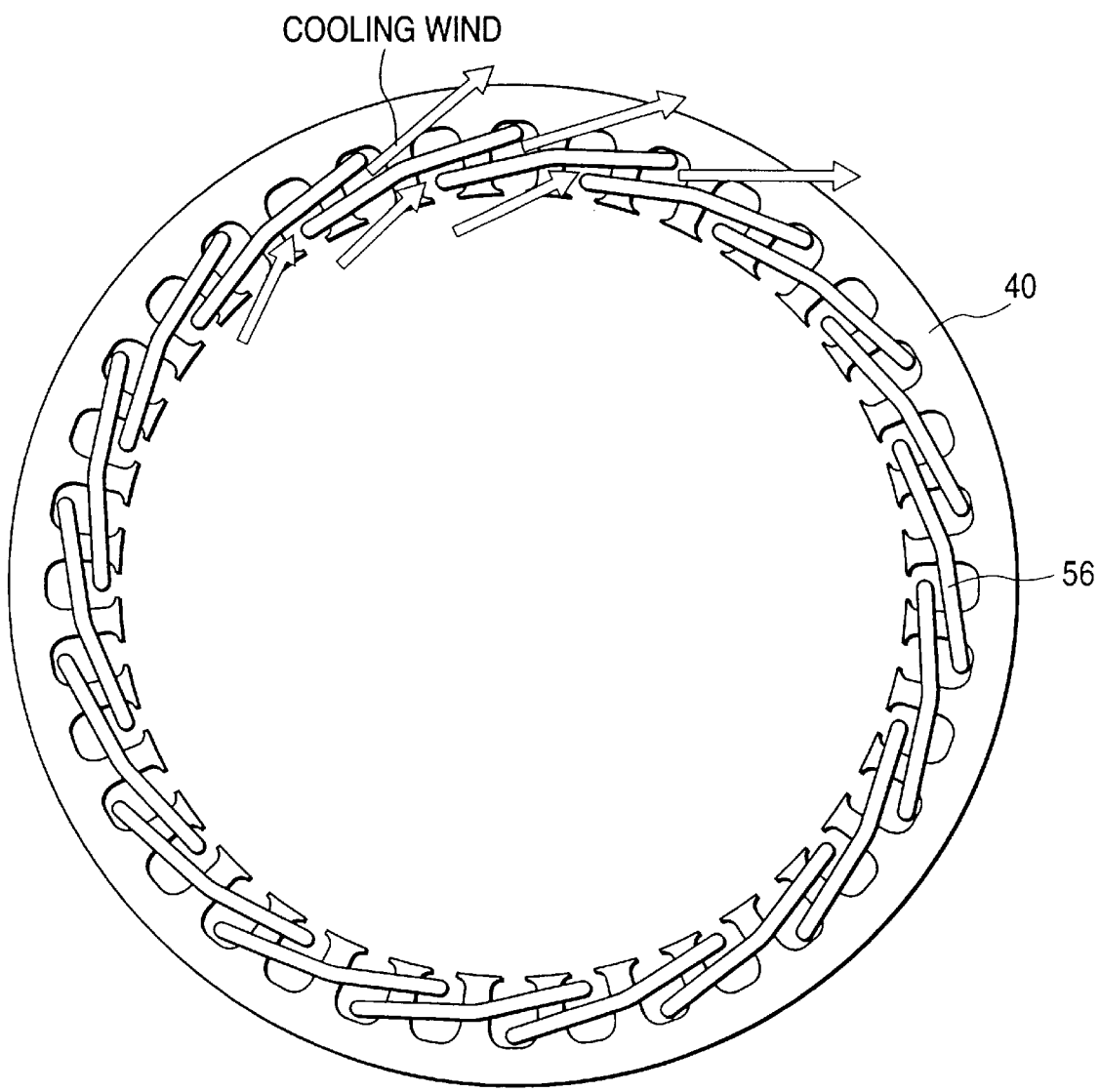
FIG. 16 is a plan view, in an axial direction, showing the shape of a coil end group in another embodiment of this invention.
Figure 17:
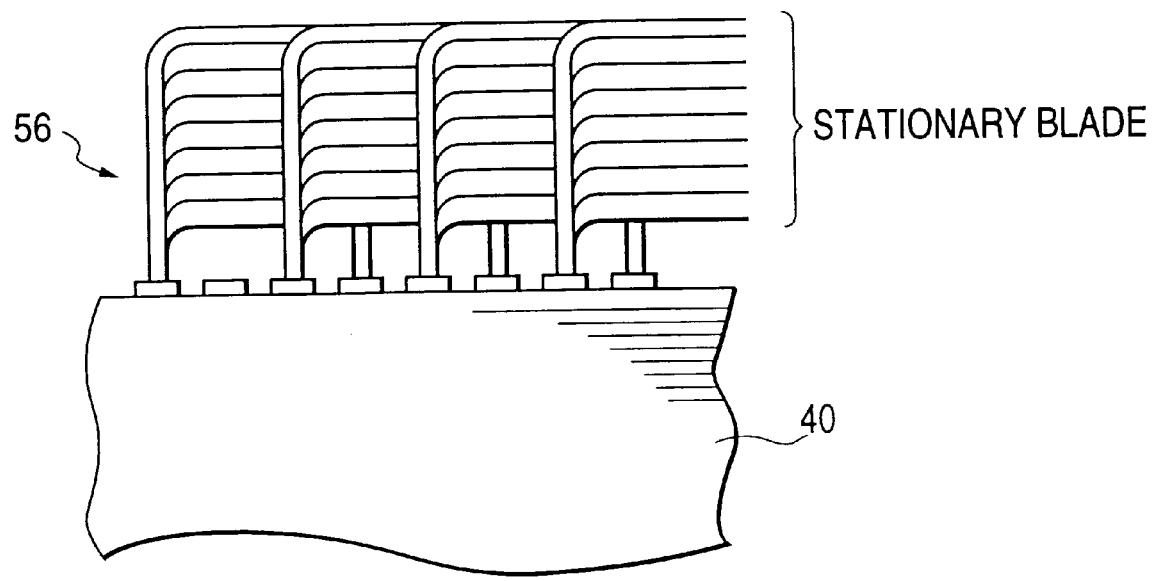
FIG. 17 is a diagram showing the shape of a coil end group in another embodiment of this invention.
Figure 18:
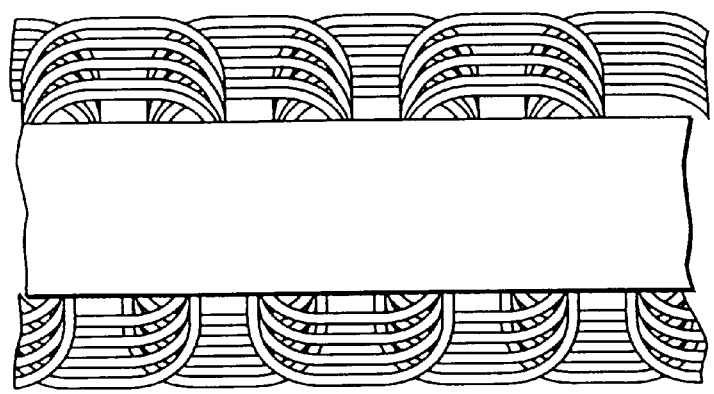
FIG. 18 is a plan view, in an axial direction, showing the shape of a prior-art coil end group.
Figure 19:
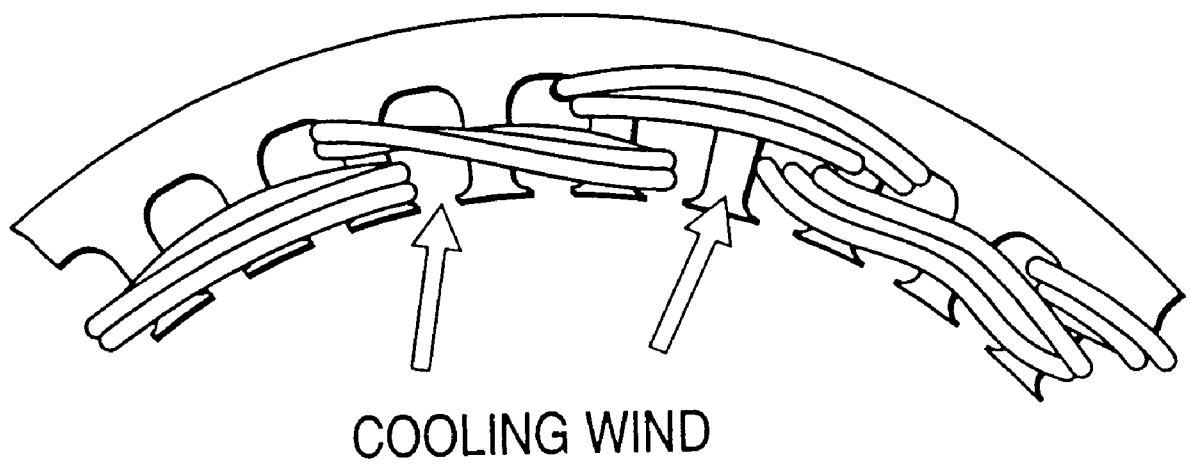
FIG. 19 is a diagram showing the shape of the prior-art coil end group.

FIGS. 16 and 17 show a modified structure in which an armature coil has a winding of a continuous wire, and ends of the armature coil are shaped into wall-like stationary blade portions regularly arranged along the direction of a rotary shaft. In the modified structure of FIGS. 16 and 17, the stationary blade portions are separated from each other to enable cooling winds to flow the regions therebetween.

What is claimed is:

1. An alternator for a vehicle, comprising:
   a frame;
   a stator fixed to the frame and having a stator iron core formed with a plurality of slots, the stator having a polyphase armature coil accommodated in the slots, the stator having ends in an axial direction of said core which are provided with coil end groups as sets of coil ends of the polyphase armature coil; and
   a rotor opposing the stator; wherein
   the rotor has moving blades for providing a cooling medium toward the coil end groups;
   the coil end groups include a plurality of stationary blade coil ends including:
   first portions extending in axial directions from an outer layer of one of two said slots spaced from each other by a predetermined pitch;
   second portions extending in axial directions from an inner layer of the other of the two slots; and
   third portions located at axial-direction end portions of the coil end groups and extending radially to connect axial-direction end portions of the first portions and the second portions;
   cooling medium passages are formed between the third portions of the stationary blade coil ends;
   the third portions extend from ends of the second portions toward ends of the first portions, and extend in a radial direction and a circumferential direction of said core and incline in a direction of rotation of the moving blades from an inner side toward an outer side; and
   the third portions form stationary blades cooperating with the moving blades of the rotor, which rotates together with the rotor, in axial-direction end surfaces of the coil end groups.

2. An alternator according to claim 1, wherein the stationary blades are formed by an arrangement of the plural coil ends.

3. An alternator according to claim 1, wherein the stationary blades are formed by flat rectangular shapes.

4. An alternator according to claim 1, wherein the stationary blades have thicknesses corresponding to thicknesses of the coil ends, and have widths greater than the thicknesses of the coil ends and extend along directions that the cooling medium flows.

5. An alternator according to claim 1, wherein the first portions and the second portions extend in circumferential direction so that said axial-direction end portions thereof are close to each other.

6. An alternator according to claim 1, wherein the stationary blades and the cooling medium of the coil end group passages have densities which are approximately uniform throughout circumferences thereof.

7. An alternator according to claim 1, wherein the stationary blades of the coil end groups have shapes approximately uniform throughout circumferences thereof.

8. An alternator according to claim 1, wherein the moving blades include fans provided on the rotor.

9. An alternator according to claim 1, wherein the coil end groups are formed on the two ends of the stator respectively, and the rotor is formed with moving blades corresponding to the coil end groups, respectively.

10. An alternator according to claim 1, wherein the armature coil has U-shaped segments each having two straight line portions and a U-shaped turn portion, the two straight line portions being accommodated in different slots respectively among the slots in the iron stator core, each of the U-shaped turn portions forming a coil end among the coil ends at an end of the stator iron core.

11. An alternator according to claim 1, wherein
the armature coil has a first three-phase connection coil and a second three-phase connection coil;
the first and second three-phase connection coils include short-pitch lap windings which are connected in an equal fashion as respective phases; and
the phases of the first and second three-phase connection coils are shifted by $\pi/3$ (radian) and are provided on the iron stator core.

12. An alternator according to claim 1, wherein a number of the slots in the stator is two per pole and per phase.

13. An alternator according to claim 1, wherein passages for direct communication from an inner side to an outer side along said circumferential direction are formed between the third portions.

14. An alternator according to claim 13, wherein the first portions of the stationary blade coil ends are located at an outermost surface of the coil end groups, and the second portions of the stationary blade coil ends are located at an innermost surface of the coil end groups, and the third portions of the stationary blade coil ends are located at a most-distal axial-direction end surface of the coil end groups.

15. An alternator for a vehicle, comprising:

a stator including a stator iron core and a polyphase armature coil, the stator iron core having a plurality of slots, the polyphase armature coil being provided on the stator iron core and having coil end groups; and a rotor for generating a rotating magnetic field intersecting the stator, the rotor having moving blades; wherein the coil end groups include a plurality of stationary blade coil ends, the stationary blade coil end including:

first portions extending in axial direction of said core from an outer layer of one of two said slots spaced from each other by a predetermined pitch;

second portions extending in axial directions from an inner layer of the other of the two slots; and third portions located at axial-direction end portions of the coil end groups and extending radically to connect axial-direction end portions of the first portions and the second portions;

passages for the cooling medium are formed between the third portions of the stationary blade coil ends;

the third portions have a plate shape and extend from ends of the second portions toward ends of the first portions, and extend in a radial direction and a circumferential direction of said core and incline in the direction of rotation of the moving blades from an inner side toward an outer side; and the third portions form stationary blades cooperating with the moving blades of the rotor, which rotates together with the rotor, in axial-direction end surfaces of the coil end groups.

16. An alternator according to claim 15, wherein the coil ends located at the passages are formed by plate-shaped conductors which extend along directions of air flows caused by the moving blades.

17. An alternator according to claim 16, wherein the stationary blade coil ends have bridge portions composed of the first and second portions, and projecting portions composed of the third portions, the bridge portions connecting accommodated portions of the polyphase armature coil in the slots which are spaced by the predetermined pitch, the projecting portions projecting from the bridge portions and forming the stationary blades.

18. An alternator according to claim 17, wherein the polyphase armature coil is formed by connecting a plurality of connected segments, the projecting portions being connection portions of the segments.

19. An alternator according to claim 16, wherein the second portions are near the moving blades, and the second portions also form stationary blades.

20. An alternator according to claim 19, wherein the second portions extend from an end surface of the stator core in said axial directions while inclining in said circumferential direction.

21. An alternator according to claim 20, wherein the first portions are more distant from the moving blades than the second portions are, and the first portions intersect the second portions.

22. An alternator according to claim 21, wherein the stationary blade coil ends have bridge portions composed of the first and second portions, and projecting portions composed of the third portions, the bridge portions being formed by inner layer portions and outer layer portions, the projecting portions projecting from the bridge portions and forming the stationary blades.

23. An alternator according to claim 22, wherein the polyphase armature coil is formed by a plurality of connected segments, the projecting portions being connection portions of the segments.

24. An alternator according to claim 16, wherein the coil ends are formed by plate-shaped conductors, and form stationary blades which cooperate with the moving blades.

25. An alternator according to claim 15, wherein passages for direct communication from an inner side to an outer side along said circumferential direction are formed between the third portions.

26. An alternator according to claim 25, wherein the first portions of the stationary blade coil ends are located at an outermost surface of the coil end groups, and the second portions of the stationary blade coil ends are located at an innermost surface of the coil end groups, and the third portions of the stationary blade coil ends are located at a most-distal axial-direction end surface of the coil end groups.

* * * * *